Aug. 7, 1956 J. W. KAUFMAN 2,757,752
VALVE ASSEMBLY FOR DRAIN CONDUITS
Filed July 30, 1952

INVENTOR.
JACK W. KAUFMAN
BY
Whittemore, Hulbert & Belknap
ATTORNEYS

United States Patent Office 2,757,752
Patented Aug. 7, 1956

2,757,752

VALVE ASSEMBLY FOR DRAIN CONDUITS

Jack W. Kaufman, Detroit, Mich.

Application July 30, 1952, Serial No. 301,707

2 Claims. (Cl. 182—25)

This invention relates to valve assemblies of the type capable for use in association with drains to prevent reverse flow of fluid therethrough.

It is an object of this invention to provide a valve assembly which not only operates effectively to prevent reverse flow through a drain but, in addition, is constructed to enable readily assembling the same as a unit within a drain of standard design without the necessity of altering the drain.

It is another object of this invention to provide a valve assembly having a ring of resilient material and having means for expanding the ring into tight frictional engagement with the adjacent walls of a drain after the assembly is inserted into the drain through the inlet end thereof.

Figure 1:
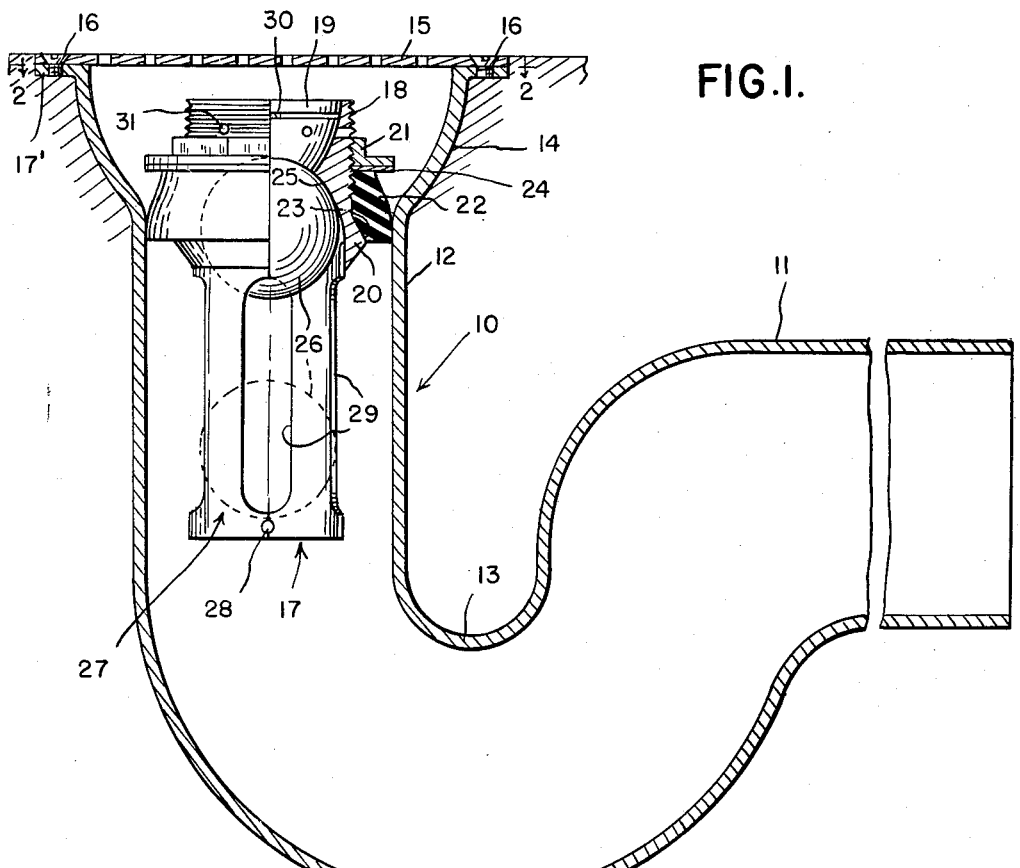
Figure 2:
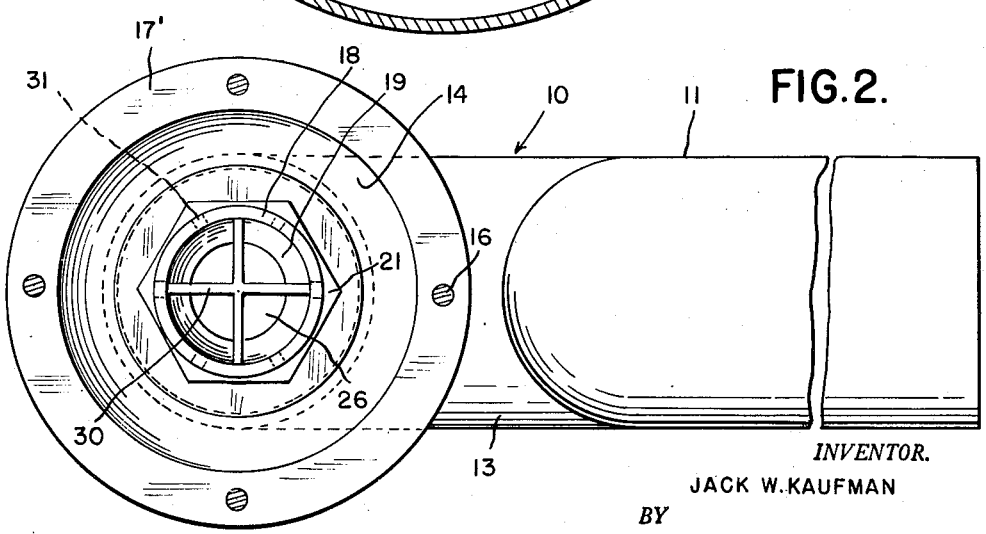

The foregoing as well as other objects will be made more apparent as this description proceeds especially when considered in connection with the accompanying drawing, wherein:

Figure 1 is a sectional view through a part of a drain conduit having a valve assembly embodying the features of this invention; and Figure 2 is a sectional view taken on the line 2—2 of Figure 1.

The numeral 10 in the drawing designates a typical floor drain in the form of a conduit 11 having the discharge end (not shown) connected to a suitable disposal system and having a riser 12 at the inlet end thereof. As is customary, the riser 12 is connected to the conduit by a trap portion 13 and the upper end of the riser 12 is enlarged to provide the usual bell mouth portion 14. The inlet opening in the portion 14 is normally closed by a perforated cover 15 which is removably secured by fastener elements 16 to a flange 17' turned outwardly from the mouth portion 14.

In many localities, much inconvenience and severe damage is frequently caused by the reverse flow of drainage water through the conduit 11 from the disposal system. Under severe conditions the reverse flow of drainage water through the conduit 11 floods basements and/or sub-floors of building structures, and in order to avoid such a possibility the present invention provides a check valve assembly 17 within the conduit 11. Briefly the check valve assembly is composed of a relatively few simple parts and may be quickly installed in the conduit 11 by the user without the necessity of providing adapters or altering the drain conduit in any way.

In detail, the valve assembly includes a tubular body 18 having a passage 19 therethrough and having an annular enlargement 20 at one end thereof. The outside diameter of the enlargement 20 is substantially less than the inside diameter of the riser 12 enabling the body 18 to assume a vertical position within the riser 12 with the enlargement 20 at the lower end of the body.

The upper end of the body 18 is externally threaded for receiving a clamping nut 21, and a sleeve or ring 22 of resilient material encircles the body 18 between the enlargement 20 and the clamping nut 21. The sleeve 22 may be formed of any suitable resilient material such for example as rubber, synthetic rubber, or materials having characteristics similar to rubber. In any case, the outside diameter of the ring 22 is somewhat less than the inside diameter of the riser 12 in order to permit freely inserting the valve assembly with the ring thereon into the upper end of the riser.

As shown in Figure 1 of the drawing, the normal internal diameter of the resilient ring 22 is less than the external diameter of the enlargement 20 and the surface 23 of the enlargement converges toward the axis of the body 18 in order to provide a tapered cam face. The arrangement is such that downward movement of the resilient ring 22 relative to the body 18 causes the cam face or surface 23 to expand the lower end of the ring 22 into tight frictional contact with the adjacent wall of the riser 12. It will be understood that the ring 22 is forced axially downwardly relative to the body 18 by tightening the nut 21 and, if desired, a washer 24 may be provided between the nut 21 and the upper end of the ring 22. Thus, it will be understood that the lower end of the resilient ring 22 is wedged between the enlargement 20 on the body 18 and the adjacent wall of the riser so that the valve assembly is firmly held in assembled relationship with the riser 12. It will also be understood that the resilient ring 22 provides an effective fluid-tight seal between the body 18 and the adjacent wall of the riser.

The body 18 of the valve assembly is fashioned with an internal annular seat 25 and this seat surrounds the passage 19 between the ends of the latter. A valve member 26 in the form of a buoyant ball, also preferably formed of rubber or rubber-like material, is supported by the valve assembly 17 below the seat 25 in a position to engage the latter and thereby close communication through the passage 19 to prevent back flow. The valve member 26 is loosely confined in a cage or retainer 27 having the upper end sleeved into the bottom of the passage 19 through the tubular body 18 and having a stop 28 in the form of a pin which extends across the lower end of the retainer to maintain the ball member within the retainer. The side walls of the retainer are slotted as at 29 to permit free flow of drainage water downwardly through the passage 19 and around the valve member 26 when the latter is in its open or broken line position shown in Figure 1 of the drawing. In this connection, it will be noted that the upper end of the passage 19 is protected somewhat against the entrance of foreign matter by a barrier in the form of a cross 30 which is suitably secured to the body 18. Also drainage openings 31 may be provided through the wall of the tubular body 18 above the valve seat 25 so that fluid trapped in the bell mouth 14 around the body 18 may escape when the valve member 26 is in its open position.

It will be apparent from the foregoing that under normal conditions the valve member 26 is in its open position or in other words is seated on the pin or stop 28 at the bottom of the retainer 27. Thus, drainage water is free to pass downwardly through the passage 19 and openings 29 in the retainer to the conduit 11. However, should there be any reverse flow of drainage water through the conduit 11, the ball or valve member 26 is raised by the drainage water backing up in the conduit 11 until it contacts the seat 25. When the ball or valve member 26 is in contact with the seat 25 the passage 19 through the valve assembly 17 is sealed and drainage water is prevented from escaping into the basement or other enclosure in connection with which the drain is employed. Also, drainage water is prevented from flowing upwardly around the valve assembly 17 by the resilient holding ring 22 previously described.

It follows from the foregoing that the various parts of the valve assembly form a unit which may be readily installed into or removed from the riser 12 of a conventional drain conduit. This may be accomplished by merely manipulating the clamping nut 21 and does not require special adapters or any change whatsoever in the structure of the drain conduit.

What I claim as my invention is:

1. A valve assembly for a drain conduit having a vertical tubular riser at the inlet end thereof which is provided with an opening at the top adapted to be closed by a removable plate, comprising an open-ended tubular body having an outside diameter less than the inside diameter of said riser and insertable into said riser in coaxial relation therewith through the opening at the top of said riser, said body having an integral annular enlargement coaxial with and encircling said body in spaced relation to the upper end thereof, said enlargement having a diameter less than the inside diameter of said riser, said enlargement having a frusto-conical cam surface the axis of which is spaced from said cam surface axially of said tubular body in a direction toward said upper end of said tubular body, the annular edge of said frusto-conical cam surface of greater diameter defining the radially outer extremity of said enlargement, a ring of resilient material encircling said body between said enlargement and said upper end of said body, said ring in its natural unstretched condition having an inside diameter less than the diameter of said enlargement and an outside diameter less than the inside diameter of said riser, the upper end portion of said body being externally threaded, means including a clamping nut threadedly mounted on the threaded upper end portion of said tubular body between said ring and said upper end of said body for moving said ring exially along said body in a downward direction toward said enlargement to force the lower end portion of said ring over the cam surface on said enlargement to expand said lower end portion of said ring into liquid-tight engagement with the adjacent walls of said riser, thereby to frictionally hold said valve assembly in place within said riser, said ring constituting the sole connection between said valve assembly and said riser, said tubular body having an annular hemispherically concave valve seat in the lower end thereof surrounding the passage through said tubular body, a buoyant spherical valve member of a size to seat within said valve seat and thereby close the passage through said tubular body, means supporting said valve member beneath said lower end of said tubular body for movement axially of said tubular body toward and away form said valve seat and respectively into and out of seating engagement with said valve seat, said last-named means comprising a retainer cage extending below said lower end of said tubular body and apertured for the passage of liquid, said tubular body having transverse drainage openings through the wall thereof between said clamping nut and the upper end of said tubular body, and means providing a barrier against the entrance of foreign matter into said tubular body including a spider having legs spanning said body and secured to the side wall thereof, said spider being located between said transverse drainage openings and the upper end of said body.

2. A valve assembly for a drain conduit having a vertical tubular riser at the inlet end thereof which is provide with an opening at the top adapted to be closed by a removable plate, comprising an open-ended tubular body having an outside diameter less than the inside diameter of said riser and insertable into said riser in coaxial relation therewith through the opening at the top of said riser, said body having an integral annular enlargement coaxial with and encircling said body in spaced relation to the upper end thereof, said enlargement having a diameter less than the inside diameter of said riser, said enlargement having a frusto-conical cam surface the axis of which is spaced from said cam surface axially of said tubular body in a direction toward said upper end of said tubular body, the annular edge of said frusto-conical cam surface of greater diameter defining the radially outer extremity of said enlargement, a ring of resilient material encircling said body between said enlargement and said upper end of said body, said ring in its natural unstretched condition having an inside diameter less than the diameter of said enlargement and an outside diameter less than the inside diameter of said riser, the upper end portion of said body being externally threaded, means including a clamping nut threadedly mounted on the threaded upper end portion of said tubular body between said ring and said upper end of said body for moving said ring axially along said body in a downward direction toward said enlargement to force the lower end portion of said ring over the cam surface on said enlargement to expand said lower end portion of said ring into liquid-tight engagement with the adjacent walls of said riser, thereby to frictionally hold said valve assembly in place within said riser, said ring constituting the sole connection between said valve assembly and said riser, said tubular body having an annular hemispherically concave valve seat in the lower end thereof surrounding the passage through said tubular body, a buoyant spherical valve member of a size to seat within said valve seat and thereby close the passage through said tubular body, means supporting said valve member beneath said lower end of said tubular body for movement axially of said tubular body toward and away from said valve seat and respectively into and out of seating engagement with said valve seat, said last-named means comprising a retained cage extending below said lower end of said tubular body and apertured for the passage of liquid, said tubular body having transverse drainage openings through the wall thereof between said clamping nut and the upper end of said tubular body.

References Cited in the file of this patent

UNITED STATES PATENTS

| Number | Name | Date |
|---|---|---|
| 267,894 | Imler | Nov. 21, 1882 |
| 402,600 | Kemp | May 7, 1889 |
| 729,996 | Bonnell | June 2, 1903 |
| 783,493 | Wood | Feb. 28, 1905 |
| 1,046,741 | Dehn | Dec. 10, 1912 |
| 1,137,516 | Moon | Apr. 27, 1915 |
| 1,753,724 | Shaw | Apr. 8, 1930 |
| 1,808,411 | Hinkston | June 2, 1931 |
| 2,016,498 | Hopewell | Oct. 8, 1935 |
| 2,328,315 | Warren | Aug. 31, 1943 |
| 2,478,976 | Modlin | Aug. 16, 1949 |
| 2,524,501 | Wilhelm | Oct. 3, 1950 |